United States Patent
Schneider

(10) Patent No.: US 6,232,686 B1
(45) Date of Patent: May 15, 2001

(54) HYSTERESIS BRAKE

(75) Inventor: Rudolf Schneider, Meckenbeuren (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 09/355,575

(22) PCT Filed: Feb. 6, 1998

(86) PCT No.: PCT/EP98/00661

§ 371 Date: Jul. 29, 1999

§ 102(e) Date: Jul. 29, 1999

(87) PCT Pub. No.: WO98/36488

PCT Pub. Date: Aug. 20, 1998

(30) Foreign Application Priority Data

Feb. 12, 1997 (DE) .............................. 197 05 290

(51) Int. Cl.$^7$ .................................................... H02K 7/10
(52) U.S. Cl. .............................. 310/77; 310/76; 310/78; 310/92; 310/93; 188/267
(58) Field of Search .................... 310/76, 77, 78, 310/92, 93; 188/267, 158, 163

(56) References Cited

U.S. PATENT DOCUMENTS

| | | | |
|---|---|---|---|
| 3,068,372 | 12/1962 | Bell | 310/93 |
| 3,700,941 | * 10/1972 | Dancun | 310/92 |
| 4,689,509 | * 8/1987 | Kumatani et al. | 310/77 |
| 5,096,024 | 3/1992 | Wu | 188/267 |
| 5,238,095 | * 8/1993 | Pedu | 192/84 R |
| 5,982,063 | * 11/1999 | Lutz et al. | 310/77 |

FOREIGN PATENT DOCUMENTS

| | | |
|---|---|---|
| 1 082 512 | 3/1960 | (DE) . |
| 1 114 917 | 10/1961 | (DE) . |
| 28 21 973 | 11/1978 | (DE) . |
| 28 45 738 | 5/1979 | (DE) . |
| 32 10 167 A1 | 9/1983 | (DE) . |
| 37 32 766 A1 | 4/1988 | (DE) . |
| 88 10 471 | 12/1988 | (DE) . |
| 44 24 457 A1 | 1/1996 | (DE) . |
| 29 31 261 | 3/1998 | (DE) . |
| 2 553 741 | 4/1985 | (FR) . |

OTHER PUBLICATIONS

"Dauermagnetische Kupplungen", Druckschrift 1141/14 dated Aug. 1969 the Deutschen Edelstahlwerke AG, Magnetfabrik Dortmund, pp. 18.

Japanese Patent Abstract, V. 013, No. 564 (E–860) dated Dec. 14, 1989, p. 1.

Hysteresehupplungen und –bremsen Catalog KB 2, dated Apr. 1995, pp. 17.

"Permanent Magnet Brakes and Clutches"dated after 1997, 1989, pp. 4.

* cited by examiner

Primary Examiner—Nestor Ramirez
Assistant Examiner—Thanh Lam
(74) Attorney, Agent, or Firm—Davis & Bujold, P.L.L.C.

(57) ABSTRACT

The invention relates to a hysteresis brake comprising a hysteresis ring (1) which is rotationally fixed to a roller (9), and a magnetic ring with magnetic poles. The magnetic ring (2) is made of permanent magnetic material and is mounted inside the hysteresis ring (1), wherein the magnetic poles are alternately along the external circumference of the magnet ring (2). The magnetic ring (2) encloses a supporting member (4), which is mounted in a rotationally secured position but which can be axially displaced around the axis by means of a regulating device (7).

9 Claims, 3 Drawing Sheets

HYSTERESIS BRAKE

The invention relates to a permanent-magnet excited hysteresis brake having one roller, one hysteresis ring and one magnetic ring provided with magnetic poles.

BACKGROUND OF THE INVENTION

The working mode of hysteresis clutches or hysteresis brakes generally depends on poles that provides a magnetic effect in synchronous running or reverse magnetism of a permanent magnetic materials in a slip operation, wherein the slip capacity is converted to heat. In particular, hysteresis brakes are suited for use as retarders in the processing of material in a production plane, e.g. cables, yarn manufacture, coil winding, etc. The system defines the speed at which the material is removed from the cycle, the retarder defining the traction. For this purpose, the material is adequately led out of the supply via a roller, e.g. by the material winding around the latter, wherein the roller transmits to the material the braking action of the hysteresis brake.

The reverse magnetization in the hysteresis ring made of semihard magnetic permanent magnetic material (sic) can be implemented by different arrangements of exciter magnets. German Patent 28 21 973 thus describes a magnetic torque clutch essentially consisting of the combination of a permanent-magnet excited eddy current clutch. Said known clutch or brake has a driving clutch body on the front side of which a flat hysteresis ring is situated. Opposite to said hysteresis ring, at adequate distance, several permanent magnets are provided in annular arrangement, the south-north alignment changing in the curve of the ring. The permanent magnets are situated on the front surface of a magnetizable disc. In this known arrangement, there is no possible adjustability of the torque.

DE-OS 37 32 766 has disclosed a permanent-magnet excited hysteresis clutch or brake with a hysteresis part designed as a bell-shaped rotor and having an exciter part consisting of an inner and an outer pole ring, wherein the magnetic poles are disposed without contact at both sides of the bell-shaped rotor; the pole rings consist of a soft magnetic material in which are located permanent magnetic pieces which are fully embedded in the soft magnetic material so that the magnetic poles facing the bell-shaped rotor are alternately formed of a permanent magnet and a soft magnet; the outer pole ring and the inner pole ring are rigidly interconnected but magnetically separated by a non-magnetizable intermediate ring.

With such a hysteresis brake, a simple design is not only achieved but also an adjustability of the torque to be transmitted due to the axial depth of immersion of the hysteresis ring body is changeable. In this known hysteresis brake, this results from an arrangement of the hysteresis ring body on a threaded spindle and fixing the position of the ring on the spindle, e.g. by a fixed nut. The torque is thus continuously changed, but in this known hysteresis brake, it is a disadvantage also that the two annular air gaps are required due to the magnet poles situated on both sides of the bell-shaped rotor and that costly processing in the form of a groove milling for embedding the permanent magnet pieces in the pole rings is required. Finally, in this known solution, it is disadvantageous that the braking torque is transmitted by the regulating device and, therefore, the fixed nut is required which at each adjusting operation has to be time-consumingly first loosened and then retightened.

The problem to be solved by this invention is to provide a simplified hysteresis brake with contactless torque transmission of a speed-independent torque which is quickly is manually adjustable as to its braking torque in very small steps which makes possible an exact reproducibility of the adjustment and ensures the uniformity of the adjustment even in case of a large number of specimens.

SUMMARY OF THE INVENTION

According to the invention, the hysteresis brake is suited, in particular, to use in textile processes, such as the processing of twine, wherein the braking torque is manually adjustable in a range between, e.g. 10% and 100%, in very small steps such as 5% steps.

Unlike in the known hysteresis brake, by providing the magnetic pole on only one surface (shell) of the magnetic ring, preferably situated inside the hysteresis ring, the advantage is achieved that only one annular air gap is needed. Since the magnetic poles are alternately embossed on the circumference of a closed ring of permanent magnetic material, only one simple part is required whereby the productions costs are reduced.

The non-rotatable connection of the roller with the hysteresis ring provides a simple, practical total design.

The segmented, radial, throughly magnetized development of the magnetic ring and the joining with an inner ring made of ferro-magnetic material affords the advantage of an extensive utilization of the relatively important magnetic material. The development according to the invention of the regulating device allows a displacement of the hysteresis ring without the braking torque acting upon the adjusting ring. The magnetic ring—even when the adjusting ring is regulated—is non-rotatably connected with a machine-fixed adapter plate. Contrary to the known solutions, there is no need of a locking device which has to be loosened for each adjustment operation.

The detent device provided, according to the invention, makes an exact reproducibility of the adjusting values possible while the provided adapter plate for adaptation to a machine ensures the easiest handling of the regulating device. A design of the detent device with flexible tabs, having spherical lug pieces and uniformly distributed longitudinal grooves, can be economically produced as plastic spray part.

Two interacting locking cams act upon the adapter plate or in the adjusting ring so that the regulating device can turn only within a specific rotation angle range and, accordingly, incorrect adjustments are prevented.

The axial arrangement of the roller by means of a central axial spring, which defines the position of the roller relative to a central bolt, makes possible a basic axial adjustment of the hysteresis brake with the aid of said bolt, and thus a fine gauging of any number of specimens so that the specimen dispersion is reduced to a minimum.

BRIEF DESCRIPTION OF THE DRAWING(S)

Figure 1:
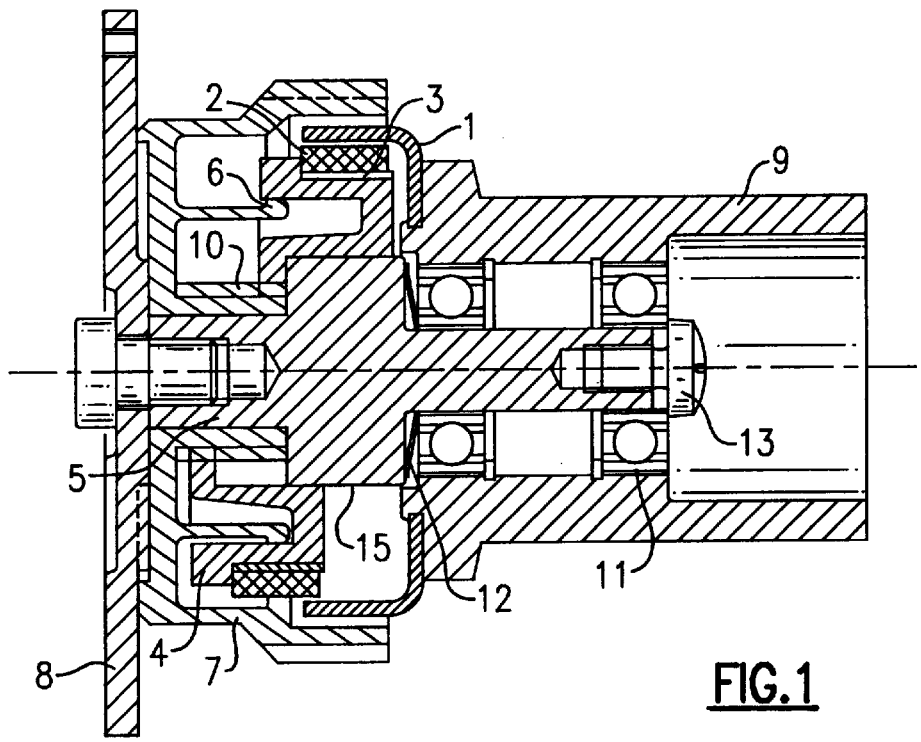
FIG. 1 is a section through a hysteresis brake according to the invention.
Figure 2:
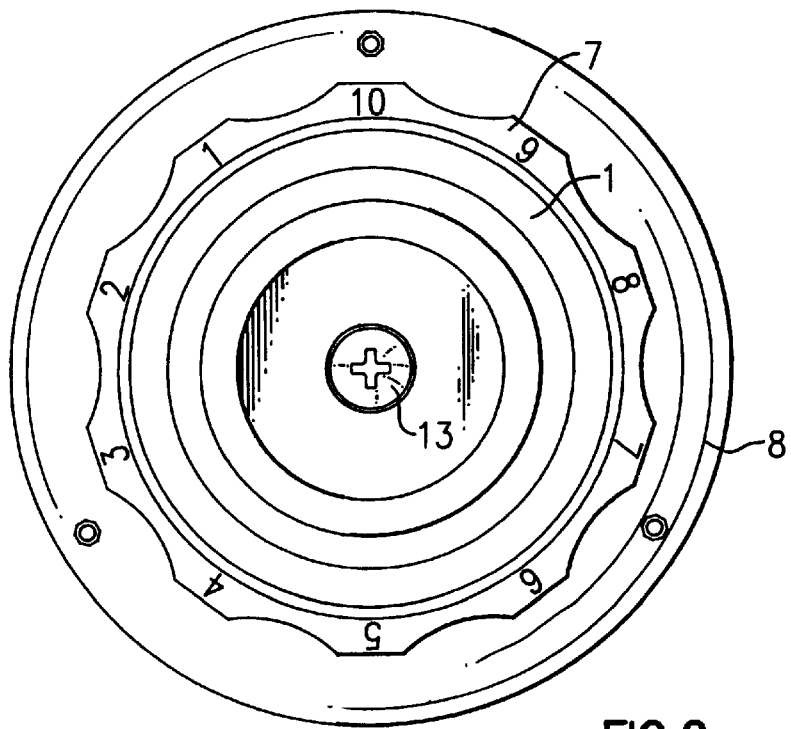
FIG. 2 is a front view on said hysteresis brake.

Since the design of the hysteresis brake is fundamentally known in relation to the embodiment, only the parts essential to the invention are explained in detail.

DESCRIPTION OF THE PREFERRED EMBODIMENT(S)

In the figures, where to the same parts the same reference numerals have been given, 9 designates a roller which serves to guide a filament in a textile process or to apply a filament tension around said roller. The roller 9 is rotatably situated over bearings 11 on an axle 5 and carries a hysteresis ring 1 which is non-rotatably connected therewith. An obvious alternative arrangement is interchanging the magnetic ring 2 and hysteresis ring 1 are, contrary to the embodiment shown, in which the magnetic ring is non-rotatably connected with the roller and the hysteresis ring is fastened on a supporting member 4.

Figure 4:
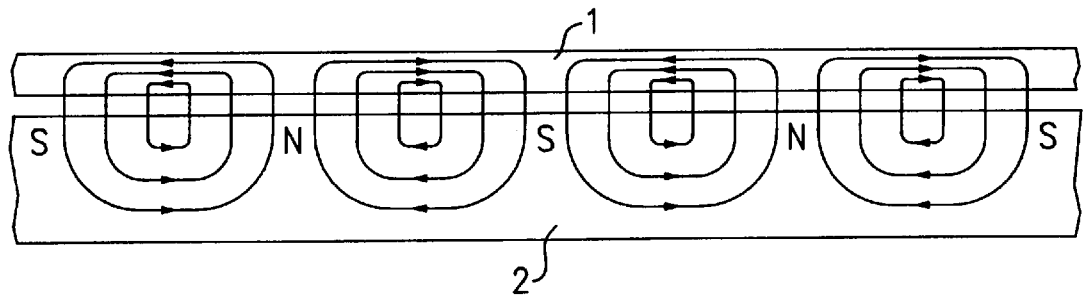
FIGS. 4 and 5 show developments of the hysteresis ring and of the magnetic ring.
Figure 5:
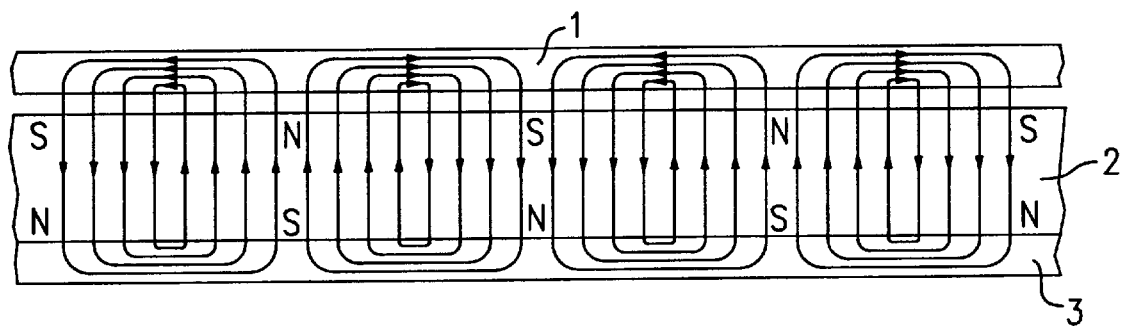

Within the hysteresis ring 1, made of magnetically semi-hardened material, is located a closed magnetic ring 2 made of permanent magnetic material the outer side of which, i.e. the surface facing the hysteresis ring (shell), is provided with a plurality of magnetic pole alternately embossed on the circumference, as indicated in FIG. 4. The magnetic ring 2 is segmentally radially thoroughly magnetized and connected with an inner ring 3 made of ferro-magnetic material (FIG. 5).

According to the invention, the magnetic ring 2 is mounted on the supporting member 4 which is secured against twisting by an hexagonal profile 15, but is axially displaceably situated on the axle 5, the supporting member 4 engaging with a threaded lug in a threaded spindle 10 of an adjusting ring 7, which is axially stationary but rotatable. Therefore, this regulating device acts not upon the hysteresis ring 1 but exclusively on the supporting member 4 which carrier the magnetic ring 2. As shown in FIG. 1 above, the center line an end position of the supporting member which corresponds to the maximum braking torque and below the center line is shown a position in which only a weak braking torque is transmissible.

The magnetic supporting member 4 and the adjusting ring 7, respectively, have one part of a detent device, said parts being formed, on one hand, by flexible tabs 6 with spherical lug connected with the adjusting ring 7 and, on the other, by uniformly distributed longitudinal grooves formed in the supporting member 4. By virtue of this simple development of the detent device, an exact reproducibility of the adjustment values is achieved.

Figure 3:
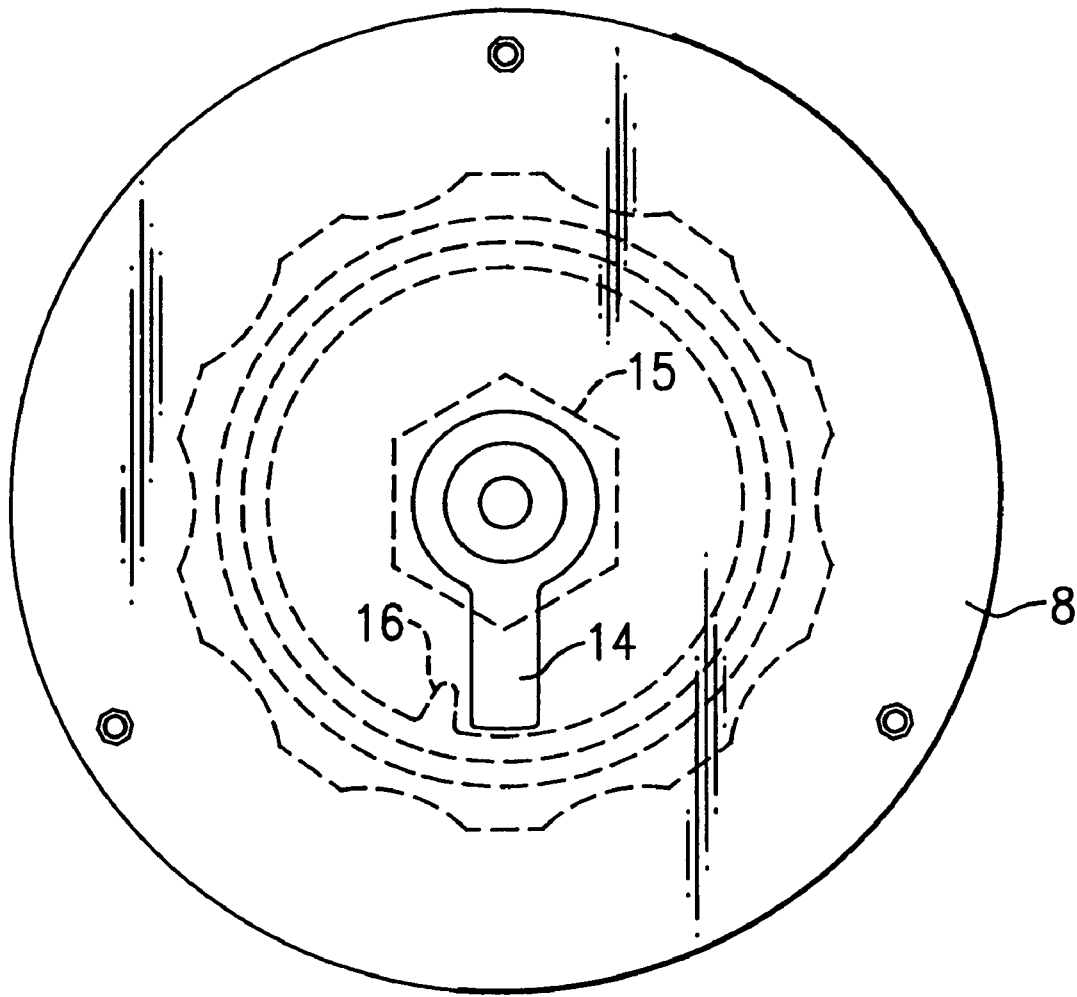
FIG. 3 is a rear view on said hysteresis brake.

The hysteresis brake is also provided with an adapter plate 8 for adaptation to a machine, said adapter plate 8 having, e.g. a locking cam 14 which interacts with locking cams 16 adapted thereto in the adjusting ring so that incorrect adjustments outside the provided torque range are prevented (FIG. 3).

The axial position of the roller 9 is advantageously defined by a central axial spring 12 against a central bolt 13. By means of said bolt is possible the axial basic adjustment of the hysteresis brake, i.e. a fine gauging of as many specimens as desired.

Therefore, according to the invention, only one annular air gap is needed with a single magnetic ring made of permanent magnetic material, the provided regulating device moving the supporting member and not the hysteresis ring. The hysteresis brake is easy to handle, finely gaugeable and during regulation transmits no braking torque to the adjusting ring so that a fixing device for the adjusting ring is unnecessary.

REFERENCE NUMERALS 1 hysteresis ring  9 roller
2 magnetic ring  10 threaded spindle
3 an inner ring made of ferromagnetic material  11 bearing
 12 axial spring
4 supporting member  13 bolt
5 axle  14 locking cam
6 tab  15 hexagonal profile
7 adjusting ring  16 locking cam
8 adapter plate

What is claimed is:

1. A permanent-magnet hysteresis brake having a roller (9), a hysteresis ring (1) and a magnetic ring (2), both rings being provided with magnetic poles and disposed concentrically, wherein said magnetic ring (2) made of permanent magnetic material is segmentally magnetized, said hysteresis ring (1) is separated by a single annular air gap from said magnetic ring (2), and said magnetic ring (2) is secured to a supporting member (4) which is axially movably mounted relative to said hysteresis ring (1) via a regulated device (4, 10, 7).

2. The hysteresis brake according to claim 1, wherein said hysteresis ring (1) is disposed radially outside said magnetic ring (2) and said magnetic ring (2) concentrically surrounds said supporting member (4).

3. The hysteresis brake according to claim 1, wherein said magnetic ring (2) is connected with an inner ring made of ferro-magnetic material (3) made of soft iron.

4. The hysteresis brake according to claim 1, wherein said regulating device consists of a threaded connection between said supporting member (4) and an adjusting ring (7) which is axially stationary but rotatable.

5. The hysteresis brake according to claim 1, wherein said magnetic ring (2) even when said adjusting ring (7) is being regulated—is non-rotatably connected with the adapter plate (8).

6. The hysteresis brake according to claim 1, wherein a detent arrangement (6) is provided between said supporting member (4) for said magnetic ring (2) and said regulating device (4, 10, 7).

7. The hysteresis brake according to claim 1, wherein said detent arrangement has flexible tabs (6) with spherical lug pieces and uniformly distributed longitudinal grooves.

8. The hysteresis brake according to claim 1, provided with a machine adapter plate (8) having a locking cam (14) which interacts with adapted locking cams (16) in said adjusting ring (7).

9. The hysteresis brake according to claim 1, wherein said roller (9) supports itself against the action of a bolt (13) via an axial spring (12) on said supporting member (4).

* * * * *